United States Patent
Prasad

[11] Patent Number: 6,008,630
[45] Date of Patent: Dec. 28, 1999

[54] SOFT-SWITCHED BUILT-IN ACTIVE SNUBBER CIRCUIT

[75] Inventor: Atluri Rama Prasad, Cypress, Tex.

[73] Assignee: Compact Computer Corporation, Houston, Tex.

[21] Appl. No.: 09/109,851

[22] Filed: Jul. 2, 1998

[51] Int. Cl.[6] ............................. G05F 1/56; H02M 3/335
[52] U.S. Cl. .............................................. 323/222; 363/21
[58] Field of Search .................................. 323/222, 326, 323/266; 363/16, 21; 327/456

[56] References Cited

U.S. PATENT DOCUMENTS

| | | | |
|---|---|---|---|
| 3,873,906 | 3/1975 | Perlman et al. | 323/236 |
| 4,184,197 | 1/1980 | Cuk et al. . | |
| 4,186,437 | 1/1980 | Cuk et al. . | |
| 4,257,087 | 3/1981 | Cuk et al. . | |
| 4,274,133 | 6/1981 | Cuk et al. . | |
| 4,355,352 | 10/1982 | Bloom et al. . | |
| 4,772,810 | 9/1988 | Felps . | |
| 5,442,539 | 8/1995 | Cuk et al. . | |
| 5,570,276 | 10/1996 | Cuk et al. . | |
| 5,841,268 | 11/1998 | Mednik | 323/222 |

*Primary Examiner*—Adolf Deneke Berhane
*Attorney, Agent, or Firm*—Robert Groover

[57] ABSTRACT

A snubber circuit with two switches which are switched together. The two switches form a pair of active networks with complementary diode locations, and a capacitor is connected to provide a path for transient current through both diodes. The two switches are preferably switched simultaneously to minimize conduction losses. When Switches S1 and S2 are turned off, the voltage through across capacitor Cs is nearly zero. Turning off S1 and S2 causes current flowing through S1 and S2 to be diverted through D1, Cs, and D2. Therefore, the voltage across S1 and S2 is a very low value and consequently, the turn-off losses are low. Alternatively, at the time when S1 and S2 are turned on, the peak current through S1 and S2 is equal to the boost inductor current. Therefore switching losses are minimized and the converter can operate at higher frequencies.

22 Claims, 4 Drawing Sheets

SOFT-SWITCHED BUILT-IN ACTIVE SNUBBER CIRCUIT

BACKGROUND AND SUMMARY OF THE INVENTION

This application is related to power conversion snubber circuits.

Switching power supplies gained popularity in the early 1970s, coinciding with the introduction of the bipolar power transistor. Since that time, many evolutionary changes have occurred to make the switching power supply meet the needs of many diverse applications. The boundaries to these application areas are determined primarily by the amount of stress the power switches (power transistors or MOSFETS) must endure and still provide reliable performance.

Background: DC—DC Converters and Single-Phase Fed AC-DC Converters

Power conversion, such as DC—DC and AC-DC was typically performed by hard-switched, pulse width modulated ("PWM") circuits such as the "boost" power converter shown in FIG. 1. It consists of an input ac source V1, an boost inductor L1, a boost switch S1, a boost diode D1, an output filter capacitor Co, and a load Ro. By varying the switching signal from the PWM controller, the duty cycle of S1 is varied and the output power is thus controlled. This is known as PWM control.

In the conventional boost power converter, when the switch S1 is open, current flows through the inductor L1 and the diode D1. The current flowing through inductor L1 and diode D1 will charge the capacitor C1. When the switch S1 is closed, current from the input voltage V1 will flow through L1 and S1 to the input voltage source. Assuming that there are no losses in the inductor L1 and negligible current drawn by the load, equating the volt-seconds across the inductor L1 to zero, and ignoring the turn-on voltage of D1, the maximum output voltage Vout can be determined from the following relationship:

$$V_{out} = V1/(1-D);$$

where D is the duty cycle of the switch.

Thus, assuming that a fixed-frequency switching signal is provided to the controllable switch S1, the higher the duty cycle of the switching signal, the higher the output voltage supplied across the output load Ro.

The above operation of the boost converter is discussed under the constraints that the power switch closely approximates that of ideal switches, i.e. that the transitions from open-to-closed and closed-to-open occur instantaneously. Unfortunately, this assumption is not particularly accurate, and consequently the finite turn-on time and finite turn-off time of the switching element causes switching losses of approximately $P \approx I_{switch} V_{switch}$.

A further problem is that, when the switch S1 turns off, the rate of rise of voltage dV/dt across S1 creates substantial unwanted radio-frequency interference ("RFI") and electromagnetic interference ("EMI") noise, which significantly limits the power conversion frequency and efficiency, particularly in the multi-kW power range.

In order to increase the power densities of the converters, the operating frequency needs to be as high as possible for any given power level. The biggest problems with conventional hard-switching PWM converters at multi-kilowatt power levels are attributable to diode stored charge, diode reverse recovery, and device switching losses. Therefore, conventional PWM converters operated at higher switching frequencies cause increased switching losses.

Background: Diode Reverse Recovery

Diode reverse recovery in the conventional hard switching boost power factor converter presents a significant limitation because it generates substantial EMI and limits the power conversion frequency and efficiency in multi-kilowatt power range. More specifically, in the conventional hard-switching boost converter of FIG. 1, when switch S1 is closed, the current through S1 increases to the level of the current through the inductor L1. At this point, the current through the diode D1 decreases until the diode D1 no longer conducts. At this time, any charge stored on the diode D1 is removed via switch S1. As the charge is being removed from the diode D1, the current through S1 continues to rise, often to a value of more than twice the inductor current level. The combination of high peak current (dI/dt) and high peak voltage (dV/dt) creates significant unwanted RFI/EMI noise, and considerably stresses the switch S1.

Background: "Soft-Switching" Reactive Snubber Circuits

In response to the problems associated with hard switching PWM power converters described above, designers have proposed the use of reactive snubber networks to "trap" energy that would normally be dissipated during switching transitions, and thereby permitting "soft-switching" of the controllable switch. Soft-switching occurs when little or no voltage appears across the switch and/or when little or no current is flowing through the switch, thereby reducing the switching stresses. Two types of such soft-switching converters are zero current switching ("ZCS") converters (in which turn-on and turn-off of switch occurs with no current in the controllable switch), and zero voltage switching ("ZVS") converters (in which turn-on and turn-off of the switch occurs with no voltage across it).

ZVS is accomplished by employing a purely capacitive snubber having an anti-parallel diode. The capacitor starts at an initial voltage, which places zero volts across the power switch at turn-off, and its voltage cannot be changed instantaneously. With ZVS circuits, turn-on occurs only when the anti-parallel diode is conducting, and turn-off losses decrease with increasing capacitance. Unfortunately, to cause conduction of the anti-parallel diode before turning-on the switch, additional circuitry is required to discharge the capacitor, or an external resistor is required to dissipate the energy stored in the capacitor during turn-on of switching cycle. Therefore, although the controllable switch can operate at elevated frequencies due to ZVS, the power losses are merely shifted from the switch to the dissipating resistor. Furthermore, if a snubber circuit is not properly designed, turn-on and turn-off of the switch itself can cause large current spikes.

On the other hand, ZCS is accomplished generally by employing a purely inductive snubber. The current through the inductor starts at an initial zero condition and lacks the ability to change instantaneously.

To solve the power dissipation problem, designers have developed "loss-less" soft-switching power converters in which the snubber networks are reset by means of inherent circuit operation. These loss-less soft-switching power converters "re-circulate" the energy stored by the reactive snubbers to accomplish loss-less operation. Unfortunately, this way of eliminating spikes requires extra power handling components which add size, weight, and cost to the power conversion system. Moreover, they often severely reduce overall system efficiency since the RMS input current is high.

Resonant Switching Converters

Other known loss-less power converters include resonant and quasi-resonant) switching converters. These converters incorporate reactive elements (capacitors and inductors) in conjunction with the switching device. In the purest sense of the word, resonance implies a continuous function whose waveform is a continuous sinusoidal signal. However, most so-called "resonant" converters are actually quasi-resonant converters—the resonant elements being operated for only one-half of a resonant sine wave at a time. The power switch in a quasi-resonant converter connects the input voltage source to the tank circuit, and is turned on and off in the same step fashion as a PWM switching power supply. The output voltage of these circuits is controlled by varying the operating frequency of the controllable switches. The conduction period (or "on" period) is dictated by the ringing frequency of the tank circuit. The power switch turns off after completion of one-half of a resonant period. A major advantage is that current during turn-on and turn-off is zero, therefore eliminating any switching losses. These circuits advantageously have low semiconductor switching losses and operate with sinusoidal waveforms. Unfortunately, resonant power converters exhibit increased component count, increased switching currents (peak and RMS), and require wide operating frequency variations to maintain a constant output voltage. Thus, resonant switching converters are relatively expensive, require complex switching control circuitry, and eliminate switching losses at the expense of conduction losses.

Modified Boost Power Converter

An example of a known ZVS resonant boost power converter is shown in FIG. 2. Further discussion regarding this circuit may be found in "Analysis and Design of a zero voltage transition power factor correction circuit," IEEE 1994 APEC, pp. 591–597, and is herein incorporated by reference. This is a modification of the hard-switching boost converter of FIG. 1. Specifically, a capacitor C2 is arranged across the switch S1. To achieve ZVS of S1, the auxiliary switch S2 is turned-on before turning-on S1. Then the current in the inductor L2 increases until it reaches the level of the current in L1. Simultaneously, the capacitor C2 and the inductor L2 create a resonance thereby reducing the voltage across the switch S1 to zero before S1 is turned-on. The diode D1 is turned off without the problem of a high reverse recovery current passing through the switch S1. The capacitor C2 minimizes the voltage across the switch S1 to a very low value during turn-off. Diode D4 blocks any current through diode D1 from entering the switching path of switch S2.

Unfortunately, the ZVS boost converter turn-off losses of the switch S2 are significant because the inductor L2 and S2 are carrying the load current before S2 is turned-off. Therefore, (1) the energy stored in the parasitic capacitance of the switch S2 dissipates in S2 during turn-on, (2) the switch S2 experiences substantial turnoff losses because it carries the full inductor current, (3) the inductor L2 must be designed to limit any reverse recovery current spike from the diode D1 during turn-on of S2, and (4) the tailing effect of IGBTs (Insulated Gate Bipolar Transistors) during turn-off causes difficulties when using IGBTs in power converters in a 1–5 kW power range.

Another example of a ZVS quasi-resonant boost power converter is shown in FIG. 3. During the turn-off of the switch S1, the inductor L2 and capacitor C2 cause a resonance, thereby making the voltage across the switch S1 nearly zero. Moreover, the switch S1 is closed when its anti-parallel diode D2 is conducting. Thus, the current is zero during turn-on of the switch S1. However, the current through S1 is sinusoidal. Thus, the peak and RMS currents are increased. Consequently, the quasi-resonant power converter eliminates switching losses at the expense of conduction losses. Furthermore, a wide range of operating switching frequencies is required to maintain a constant output voltage.

Summary of Conventional Prior-Art Circuits

Although these known loss-less boost power converters have better characteristics than the hard-switching converters, certain disadvantages still remain. Specifically, the known ZVS boost power converter second switch is not loss-less, as explained earlier. On the other hand, although a resonant switching power converter may eliminate switching losses, it increases conduction losses. Moreover, the output voltage in the resonant switching converters is controlled by frequency modulation. Therefore, this circuit requires additional circuitry to carry out such frequency modulation.

Accordingly, an improved switching power converter is needed for 1–5 kW output power levels. The improved active network should be capable of operating at higher switching frequencies to increase power density (watts per cubic inch). The improved snubber network should eliminate reverse recovery current spikes in the switching power converter. It should also limit peak device voltage and current stresses, limit peak capacitor voltages, limit RMS currents, have low sensitivity to second order effects, have low EMI, and be capable of using widely available control integrated circuits. Lastly, the improved active snubber network should be adaptable for use in various switching power converter circuits such as boost, buck, forward and flyback power converters.

Soft-Switched Built-In Active Snubber Circuit

This application discloses a zero-voltage soft-switched power converter using an active snubber circuit. The innovative soft-switching power converter has relatively low conduction losses compared to resonant topologies. This is accomplished by modifying conventional switching power converters and providing an improved active snubber network. The low losses are due to the capability of switching a pair of active-element networks simultaneously. Moreover, only one inductor is required with the pair of active networks.

This active snubber circuit improves efficiency, power density, and transient performance, reduces switching losses and EMI, and also operates at a fixed switching frequency. The proposed network also reduces and/or eliminates the large currents and reverse recovery current spikes normally seen in conventional switching power converters. This circuit may be used in various switching power topologies such as boost, flyback and forward power converters.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Innovative Soft-Switching Snubber Circuit

Figure 1:
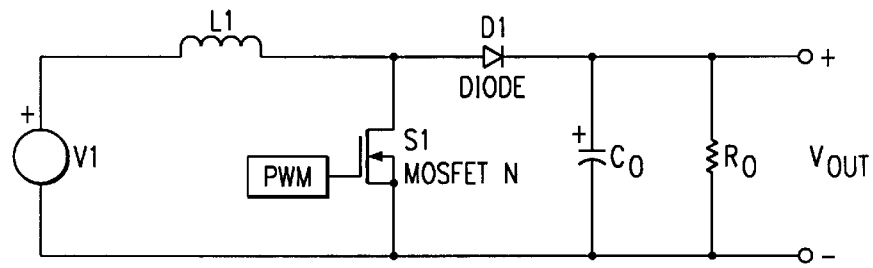
FIG. 1 shows a prior-art hard-switching "boost" power converter circuit.
Figure 2:
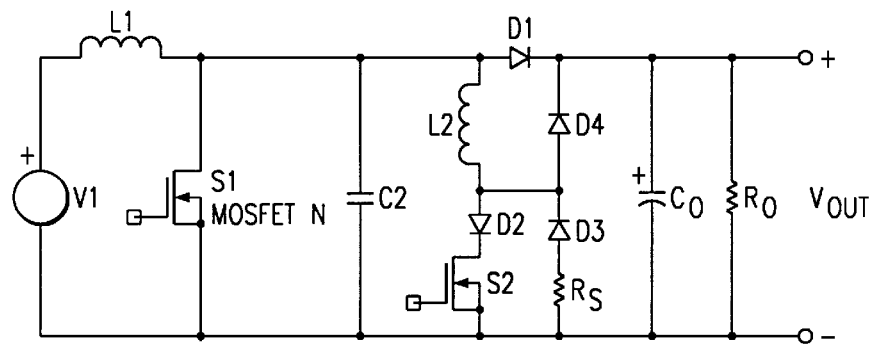
FIG. 2 shows a modification to the circuit of FIG. 1 by adding capacitance across the switch.
Figure 3:
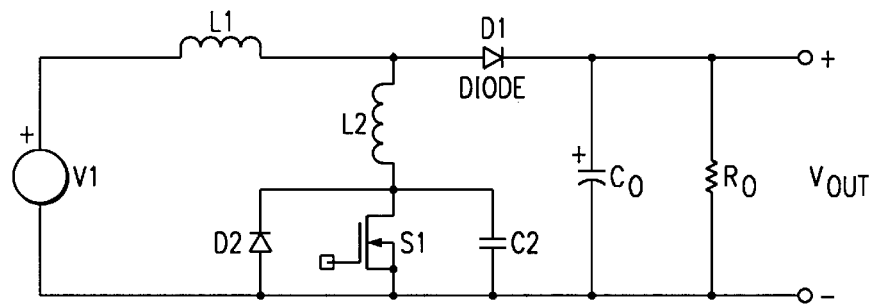
FIG. 3 shows a prior-art ZVS quasi-resonant boost power converter.
Figure 4:
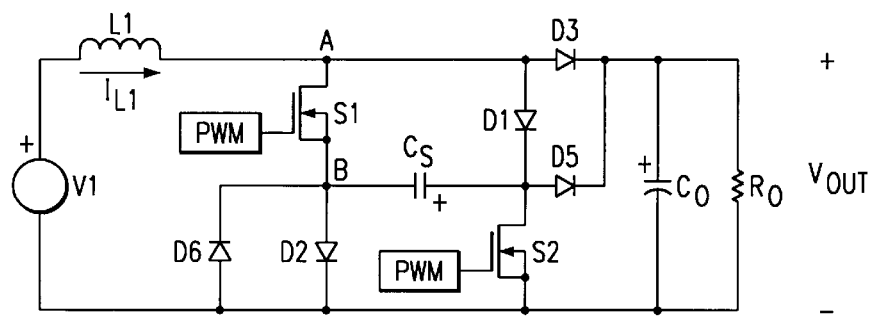
FIG. 4 shows a soft-switching snubber circuit according to the presently preferred embodiment.

As shown in FIG. 4, the active snubber network of the present invention consists of an input source V1 (e.g. a full-wave rectifier followed by a capacitor), an inductor L1, a pair of active networks comprising series-connected diodes and switches (S1/D2 & S2/D1), the pair also being connected in parallel, a capacitor Cs, a boost diode D3, and an output filter capacitor Co connected across the load Ro. A diode D5 clamps the capacitor voltage $V_{Cs}$ to the output voltage Vout. The active snubber circuit, in the presently preferred embodiment, may be employed in power circuits of up to 5 kW. The active network of the present embodiment is designed with a switching power converter such that switches S1 and S2 are turned-on and turned-off simultaneously. By varying the switching signal from the pulse-width modulation controller PWM, the duty cycle of switches S1 and S2 is varied and the output power is thus controlled. A diode D6 limits the voltage present at Node B to a deviation of one diode drop, and directs inductor current during switch turn-on. Switches S1 and S2 should be matched for optimum performance. The voltage across switches S1 and S2 during turn-off is given by $dV/dt=I_{L1}/Cs$, where $I_{L1}$ is the inductor L1 current during turn-off, and $dV/dt$ is the rate of rise of voltage across switches S1 and S2. The value of Cs is given by $CS=(I_{L1}/\Delta V)(\Delta t)$. Thus, for any given power level, the value of capacitor Cs can be found from the above equation.

Voltage and Current Plots

Figure 5A:
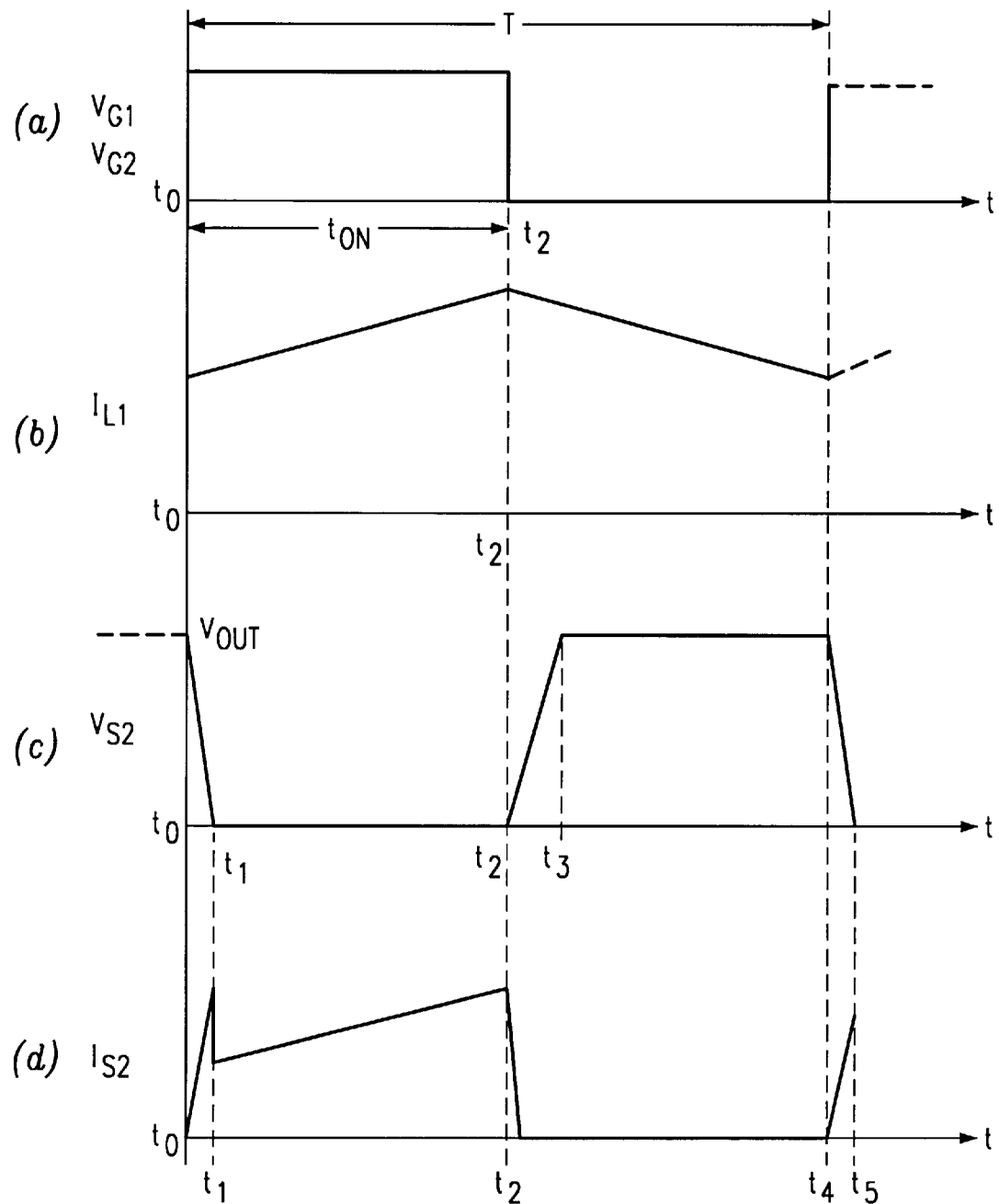
FIGS. 5A and 5B are parts of a common graph of voltages and currents of the circuit devices of FIG. 4.
Figure 5B:
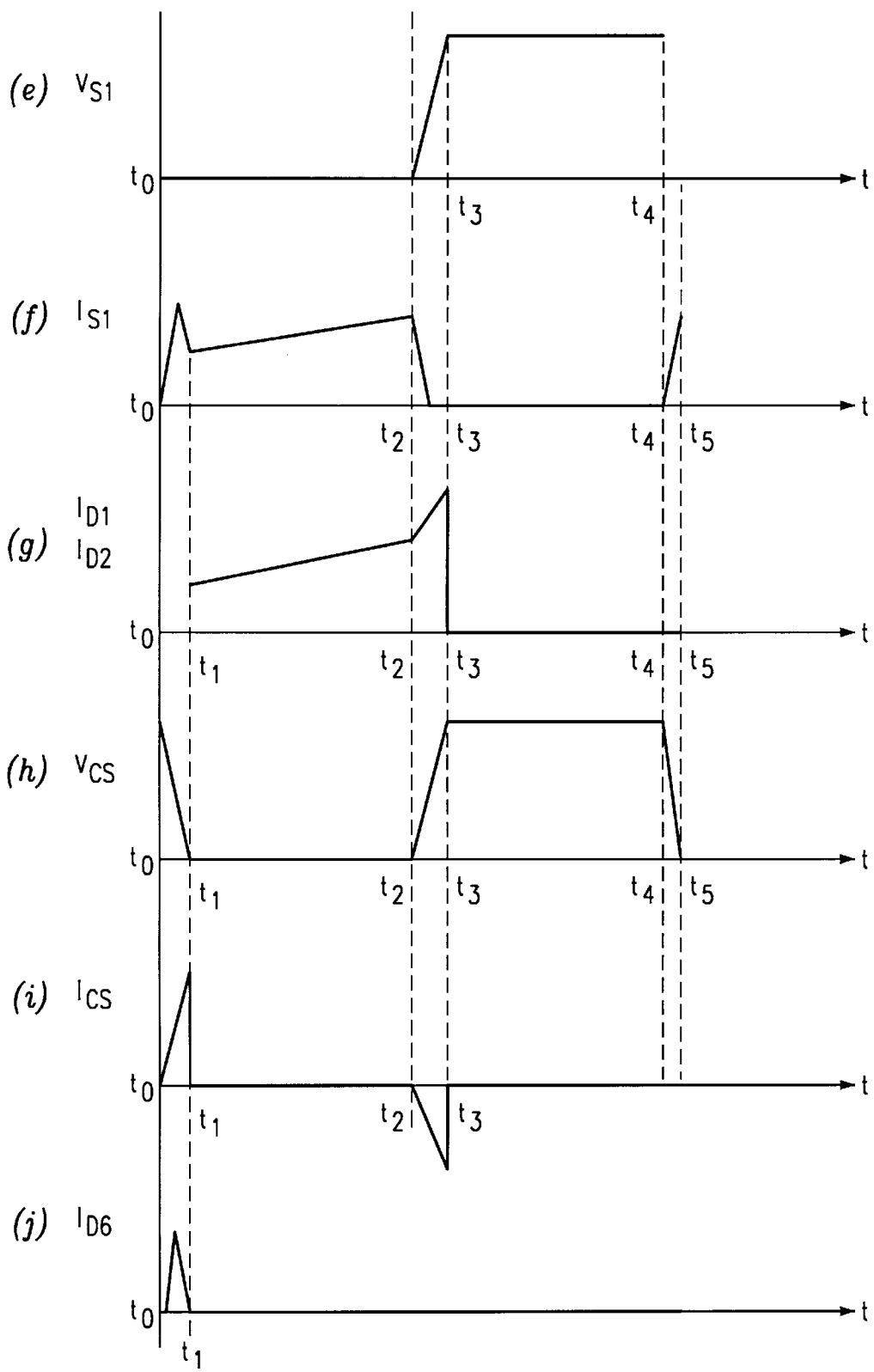

FIGS. 5A and 5B show graphs of device voltages and currents of the circuit of FIG. 4. Trace (a) in FIG. 5A depicts a period T in which both switches are simultaneously turned ON (respective gate voltages $V_{G1}$ and $V_{G2}$ are at a high level), and then both are simultaneously turned OFF (respective gate voltages $V_{G1}$ and $V_{G2}$ are at a low level).

Circuit Discussion from the Perspective of Diodes D3 and D6

Before switches S1 and S2 turn-on, the voltage at the source of S1 (Node B) will be within one diode voltage drop of ground.

At the instant in time when the boost diode D3 is conducting, and S1 and S2 are turned-on by respective control circuitry, the voltage at the drain of S1 (Node A) is approximately equal to the output voltage Vout, due to the reverse recovery of diode D3. Turning-on switch S1 also causes the voltage at the source of S1 (Node B) to be clamped to one diode forward voltage above ground. This causes diode D6 to be reverse-biased at this instant, and therefore D6 will not conduct. Consequently, turning-on S1 and S2 connects the positive terminal of capacitor Cs to ground, through switch S2.

Once the boost diode D3 is completely turned-off, current flowing through boost inductor L1 and boost diode D3 is completely diverted to S1, Cs, and S2. During this period of time, the capacitor voltage VCS reverse-biases diodes D1 and D2, and forward-biases diode D6. When diode D2 is reverse-biased, the boost inductor current (flowing through D3 before turn-on of S1 and S2) is now forced to flow through S1, Cs, and S2. At the same time, diode D6 also conducts to discharge capacitor Cs to zero volts (trace (h) in FIG. 5B). The current flowing through D6 is much smaller than the value of the inductor current. At the end of this period (beginning of time $t_1$), D1 and D2 become forward-biased and the inductor current $I_{L1}$ is shared by the two parallel networks (S1/D2 and S2/D1). Therefore, when switches S1 and S2 are turned on, the reverse recovery current spikes of boost diode D3 are minimized by controlling the turn-on speed of S1 and S2 through their gate resistor values.

From the above discussion, the peak current flowing through S1 and S2 during turn-on is equal to the boost inductor current value $I_{L1}$. Similarly the voltage across S1 and S2 during turn-off is limited to a very low value. Therefore, the switching losses are minimized and the converter can operate at higher switching frequencies. Moreover, this circuit can use integrated circuits which are currently available on the market without any additional investment. Furthermore, this circuit can easily be extended to fly-back, forward, and other single switch converters.

Circuit Discussion from the Perspective of Switches S1 and S2

At time $t_0$, when switches S1 and S2 are turning-on, diodes D1 and D2 are reverse-biased due to the capacitor Cs voltage polarity (trace (g)). The inductor current $I_{L1}$ (trace (b)) flowing through boost diode D3 is being transferred to switch S1, capacitor Cs, and switch S2 (see traces (b), (i), and (d), respectively) while capacitor Cs is also being discharged to zero volts (through inductor L1, as shown in trace (h)). At the end of discharge cycle of capacitor Cs to zero, diodes D1 and D2 become forward-biased (see trace (g) at time $t_1$) and the inductor current $I_{L1}$ is completely transferred to S1/D2 and D1/S2.

At time $t_2$, when switches S1 and S2 are turned-off (trace (a)), the voltage $V_{Cs}$ across capacitor Cs is nearly zero (trace (h)). Turning-off switches S1 and S2 diverts current (normally flowing through S1 and S2), through D1, Cs, and D2, causing the voltage across switches S1 and S2 ($V_{S1}$ and $V_{S2}$) to drop to a very low value (see traces (c) and (e)). Therefore, S1 and S2 are turning-off when the voltage across capacitor Cs is a very low value (approximating zero volts). Hence only very low turn-off losses are associated with switches S1 and S2.

Also at time $t_2$, the voltage $V_{Cs}$ across capacitor Cs (trace (h)) starts rising with the polarity as shown in FIG. 4. (Capacitor Cs is charged at a rate determined by the $I_{L1}/Cs$.) Once the capacitor voltage $V_{Cs}$ reaches the level of the output voltage Vout plus the diode forward voltage (at time $t_3$), diodes D5 and D3 become forward-biased, and the capacitor voltage $V_{Cs}$ is clamped to the output voltage Vout (trace (h)).

As mentioned in the above discussion, switches S1 and S2 are turning-off when the voltage across them drops to a very low value, and the capacitor Cs is being discharged through the boost inductor L1 during turn-on of S1 and S2. However, in practice, Node B (the node between S1 and D2) is floating during the boost diode D3 conduction period. Consequently, the value of the voltage at Node B during this period is undefined (it can go negatively as much as possible). By connecting an anti-parallel diode D6 across D2, the voltage at Node B is limited to a deviation of one diode voltage drop. Additionally, by connecting D6 and D2 back-to-back, boost inductor current $I_{L1}$ during turn-on is forced to flow through the capacitor Cs during discharging.

Computer Embodiment

Figure 7:
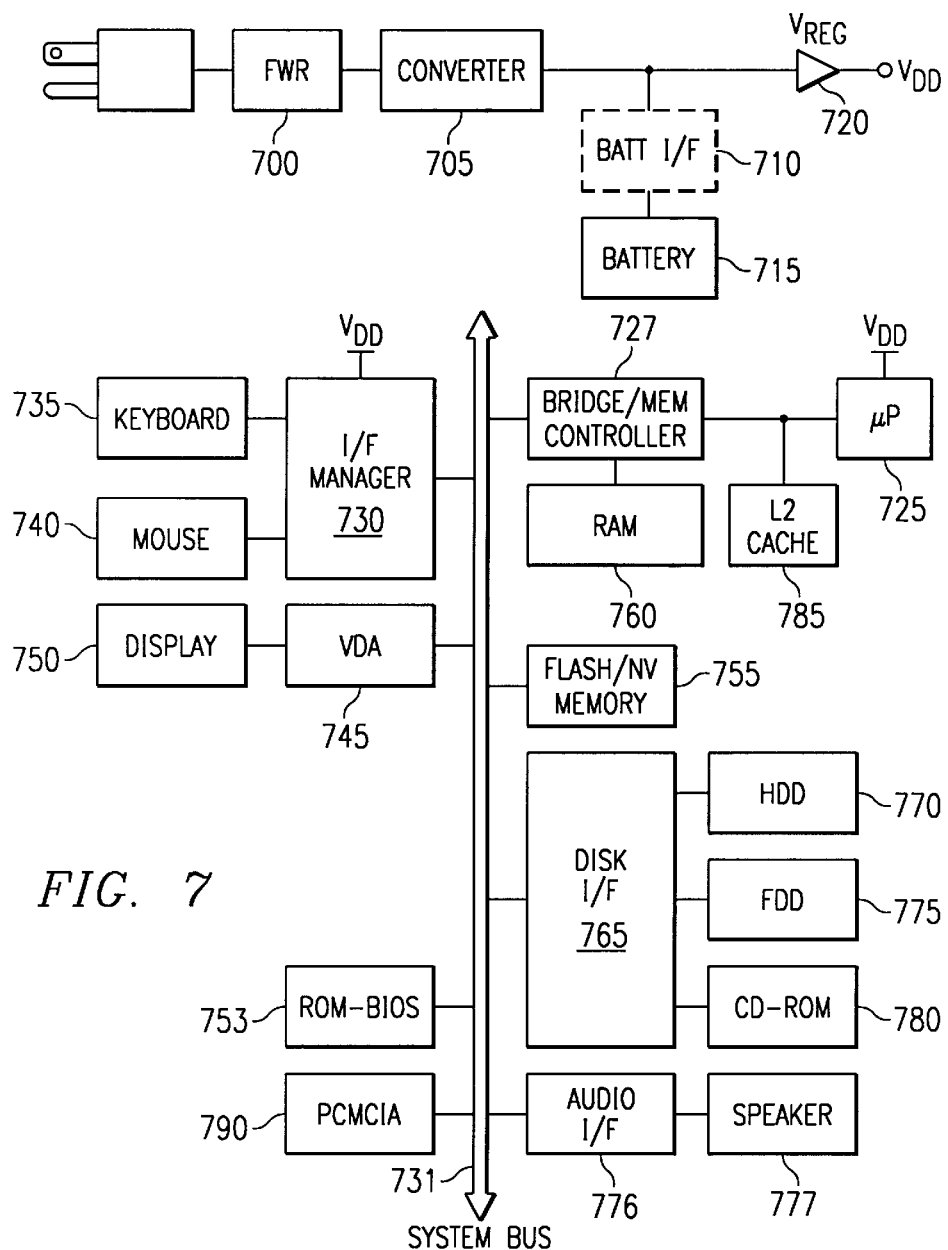
FIG. 7 shows a computer incorporating the innovative circuit.

FIG. 7 shows a portable computer incorporating the innovative snubber circuit. (Note that the innovative circuit is not limited to portable computers, but may also be used advantageously in any other computer systems.) The computer system includes a power converter 705 embodying the innovative snubber circuit, and which is used to charge a battery 715 (i.e. an electrochemical source). Optionally, a battery interface 710 is interposed between the battery and the rest of the circuitry. The power converter 705 is connected, through a full-wave bridge rectifier, 700, to draw power from AC mains, and is connected to provide a DC voltage to the battery 715. The battery 715 (or the converter 705), connected through a voltage regulator 720, is able to power the complete portable computer system, which includes in this example:

- user input devices (e.g. keyboard 735 and mouse 740);
- at least one microprocessor 725 which is operatively connected to receive inputs from the input devices, across perhaps a system bus 731, through an interface manager chip 730 (which also provides an interface to the various ports); the microprocessor interfaces to the system bus through perhaps a bridge controller 727;
- a memory (e.g. flash or non-volatile memory 755, RAM 760, and BIOS 753), which is accessible by the microprocessor;
- a data output device (e.g. display 750 and video display adapter card 745) which is connected to output data generated by the microprocessor 725; and
- a mass storage disk drive 770 which is read-write accessible, through an interface unit 765, by the microprocessor 725.

Optionally, of course, many other components can be included, and this configuration is not definitive by any means. For example, the portable computer may also include a CD-ROM drive 780 and floppy disk drive ("FDD") 775 which may interface to the disk interface controller 765. Additionally, L2 cache 785 may be added to speed data access from the disk drives to the microprocessor 725, and a PCMCIA 790 slot accommodates peripheral enhancements. The computer may also accommodate an audio system for multimedia capability comprising a sound card 776 and a speaker(s) 777.

Alternative Embodiment: Flyback and Forward Converter

Figure 6:
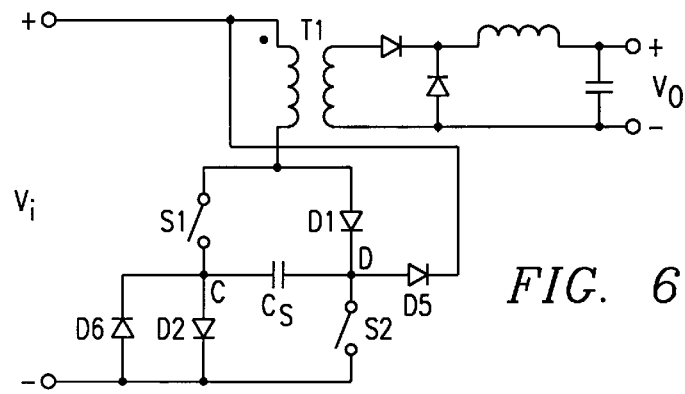
FIG. 6 shows an alternative embodiment using a flyback and forward converter.

FIG. 6 shows an alternative embodiment using a flyback and forward converter. Switches S1 and S2 are turned on and off substantially simultaneously by using a PWM to vary the duty cycle, and ultimately control the output power. Diode D6 limits the voltage at Node C to a deviation of one diode drop. Capacitor Cs is interposed between Node C and Node D to minimize switching losses of switches S1 and S2. Switch S2 connects one leg of capacitor Cs to ground while switch S1 connects the other terminal to the transformer T1 primary winding.

According to a disclosed class of innovative embodiments, there is provided: a switched-mode power converter, comprising: at least a first energy storage element; and a switching circuit which is connected to modulate current through said energy storage element, and which comprises first and second switching networks, defining respective first and second nodes therebetween; and a capacitor interposed between said first and second nodes; whereby switching losses are minimized.

According to another disclosed class of innovative embodiments, there is provided: a switched-mode power converter, comprising: at least a first energy storage element; and a switching circuit connected to modulate current through said energy storage element, and which comprises a first switching network comprising a first switching element connected in series with a first rectifying element, and defining a first node therebetween; a second switching network comprising a second switching element connected in series with a second rectifying element, and defining a second node therebetween; and a capacitor interposed between said respective nodes of said first and second switching networks; whereby switching losses are minimized.

According to another disclosed class of innovative embodiments, there is provided: a switched-mode power converter, comprising: at least a first energy storage element; and a switching circuit connected to modulate current through said energy storage element, and which comprises; first and second switching networks, defining respective first and second nodes therebetween; a capacitor interposed between said respective first and second nodes; and one or more clamping elements to limit the voltage at said first and second nodes.

According to another disclosed class of innovative embodiments, there is provided: a computer system, comprising: a user input device, at least one microprocessor operatively connected to detect inputs from said input device, random-access memory which is connected to be read/write accessible by said microprocessor, and a display operatively connected to receive outputs from said microprocessor; and power supply circuitry connected to provide power to said microprocessor, said memory, and said output device, and comprising a switched-mode power converter comprising at least a first energy storage element; and a switching circuit which is connected to modulate current across said energy storage element, and which comprises first and second switching networks, defining respective first and second nodes therebetween; and a capacitor connecting said first and second nodes.

According to another disclosed class of innovative embodiments, there is provided: a portable computer system, comprising: a user input device, at least one microprocessor operatively connected to detect inputs from said input device, random-access memory which is connected to be read/write accessible by said microprocessor, and a display operatively connected to receive outputs from said microprocessor; power supply circuitry, including at least one electrochemical power source, connected to provide power to said microprocessor, said memory, and said output device; and a switched-mode power converter comprising at least a first energy storage element; and a switching circuit connected to modulate current through said energy storage element, and which comprises a first switching network comprising a first switching element connected in series with a first rectifying element, and which define a first node therebetween; a second switching network comprising a second switching element connected in series with a second rectifying element, and defining a second node therebetween; and a capacitor interposed between said respective nodes of said first and second switching networks.

According to another disclosed class of innovative embodiments, there is provided: a computer system, comprising: a user input device, at least one microprocessor operatively connected to detect inputs from said input device, random-access memory which is connected to be read/write accessible by said microprocessor, and a display operatively connected to receive outputs from said microprocessor; and power supply circuitry connected to provide power to said microprocessor, said memory, and said output device, and comprising a switched-mode power converter comprising at least a first energy storage element; and a switching circuit connected to modulate current through said energy storage element, and which comprises; first and second switching networks, defining respective first and second nodes therebetween; a capacitor connecting said respective first and second nodes; and one or more clamping elements to limit the voltage at said respective nodes.

According to another disclosed class of innovative embodiments, there is provided: a method for minimizing switching losses in switched-mode power converter, comprising the steps of: (a.) limiting peak current flowing through first and second switching networks to the current of a first energy storage element; (b.) limiting the voltage across said first and second switching networks during turn-off of respective first and second switching elements, to a low value; wherein said first and second switching elements switch substantially simultaneously when the voltage across respective said first and second switching elements is low, to minimize switching losses; whereby switching losses are minimized, and said converter can operate at higher frequencies.

According to another disclosed class of innovative embodiments, there is provided: a method for minimizing switching losses in switched-mode power converter, comprising the steps of: (a.) limiting peak current flowing through first and second switching networks to the current of a first energy storage element; wherein said first switching network comprises a first switching element connected through a first node, and in series with, a first rectifying element; wherein said second switching network comprises a second switching element connected through a second node, and in series with, a second rectifying element; (b.) limiting the voltage across said first and second switching networks during turn-off of said first and second switching networks, to a low value; and (c.) interposing a capacitor between said first and second nodes.

According to another disclosed class of innovative embodiments, there is provided: a method for minimizing switching losses in switched-mode power converter, comprising the steps of: (a.) providing at least a first energy storage element for energy storage; (b.) modulating current through said energy storage element with at least first and second switching networks, said switching networks defining respective first and second nodes therebetween; and (c.) clamping the voltage at said respective first and second nodes with one or more clamping elements; wherein said first and second switching networks switch substantially simultaneously when the voltage across respective said first and second switching networks is low, to minimize switching losses.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, within the constraints well-known to those of ordinary skill, the disclosed innovative technique may also be applied to flyback, forward, and other single switch converters.

Of course, in implementing power supply circuits and systems, safety is a very high priority. Those of ordinary skill in the art will therefore recognize the necessity to review safety issues carefully, and to make any changes in components or in circuit configuration which may be necessary to improve safety or to meet safety standards in various countries.

What is claimed is:

1. A method for minimizing switching losses in switched-mode power converter, comprising the steps of:
    (a.) limiting peak current flowing through first and second switching networks to the current of a first energy storage element;
    (b.) limiting the voltage across said first and second switching networks during turn-off of respective first and second switching elements, to a low value;
    wherein said first and second switching elements switch substantially simultaneously when the voltage across respective said first and second switching elements is low, to minimize switching losses;
    whereby switching losses are minimized, and said converter can operate at higher frequencies.

2. The method of claim 1, wherein said first energy storage element is an inductor.

3. The method of claim 1, wherein each said switching network further comprises a rectifying element which is a diode.

4. The method of claim 1, wherein a first diode connected antiparallel with a first rectifying element of said first switching network limits the voltage present at said first node to a deviation of one diode drop.

5. The method of claim 1, wherein turning on said first and second switching elements connects the positive terminal of said capacitor to ground, through said second switching element.

6. The method of claim 1, further comprising a boost diode in series with said first energy storage element, the combination of which is in series with a load, such that when said boost diode is completely turned off, current flowing through said first energy storage element and said boost diode is completely diverted to said first and second switching elements and said capacitor.

7. The method of claim 1, further comprising a boost diode in series with said first energy storage element, the combination of which is in series with a load, such that when said boost diode turns off, a first diode connected antiparallel with a first rectifying element of said first switching network, conducts to discharge said capacitor to approximately zero volts.

8. The method of claim 1, wherein said first and second switching elements are turned off when t he voltage across said capacitor is approximately zero volts.

9. The method of claim 1, wherein a capacitor is being discharged during turn-on of said first and second switching elements, and said first and second switching elements are turning off when the voltage across respective switching element is approximately zero volts.

10. A method for minimizing switching losses in switched-mode power converter, comprising the steps of:
    (a.) limiting peak current flowing through first and second switching networks to the current of a first energy storage element; wherein said first switching network comprises a first switching element connected through a first node, and in series with, a first rectifying element; wherein said second switching network comprises a second switching element connected through a second node, and in series with, a second rectifying element;

(b.) limiting the voltage across said first and second switching networks during turn-off of said first and second switching networks, to a low value; and (c.) interposing a capacitor between said first and second nodes.

11. The method of claim 10, wherein said first and second switching networks are connected in parallel with each other and an output.

12. The method of claim 10, wherein said first and second switching elements are controlled by a pulse-width modulator circuit.

13. The method of claim 10, wherein a first diode connected antiparallel with said first rectifying element limits the voltage present at said first node to a deviation of one diode drop.

14. The method of claim 10, further comprising a boost diode in series with said first energy storage element, the combination of which is in series with a load, such that when said boost diode is completely turned off, current flowing through said first energy storage element and said boost diode is completely diverted to said first and second switching networks and said capacitor.

15. The method of claim 10, wherein said first and second switching elements are turned off when the voltage across said capacitor is approximately zero volts.

16. The method of claim 10, wherein said capacitor is being discharged during turn-on of said first and second switching elements, and said first and second switching elements are turning off when the voltage across respective switching element is approximately zero volts.

17. A method for minimizing switching losses in switched-mode power converter, comprising the steps of:

(a.) providing at least a first energy storage element for energy storage;

(b.) modulating current through said energy storage element with at least first and second switching networks, said switching networks defining respective first and second nodes therebetween; and (c.) clamping the voltage at said respective first and second nodes with at least one clamping element;

wherein said first and second switching networks switch substantially simultaneously when the voltage across respective said first and second switching networks is low, to minimize switching losses.

18. The method of claim 17, wherein said first and second switching networks are connected in parallel with each other and an output.

19. The method of claim 17, wherein each switching network further comprises a rectifying element which is a diode.

20. The method of claim 17, wherein turning on first and second switching elements of said respective first and second switching networks connects the positive terminal of a capacitor to ground, through said second switching element.

21. The method of claim 17, further comprising a boost diode in series with said first energy storage element, the combination of which is in series with a load, such that when said boost diode turns off, a first clamping element connected antiparallel with a first rectifying element of said first switching network, conducts to discharge said capacitor to approximately zero volts.

22. The method of claim 17, wherein first and second switching elements of respective said first and second switching networks are turned off when the voltage across a capacitor is approximately zero volts.

* * * * *

UNITED STATES PATENT AND TRADEMARK OFFICE
CERTIFICATE OF CORRECTION

PATENT NO. : 6,008,630
DATED : December 28, 1999
INVENTOR(S) : Atluri Rama Prasad It is certified that error appears in the above-identified patent and that said Letters Patent is hereby corrected as shown below:

Title Page,
Item [73] Assignee should be changed from Compact Computer Corporation to: Compaq Computer Corporation Signed and Sealed this Twenty-fourth Day of July, 2001

Attest:

NICHOLAS P. GODICI
Attesting Officer
Acting Director of the United States Patent and Trademark Office